US012174573B2

(12) United States Patent
Taniguchi et al.

(10) Patent No.: US 12,174,573 B2
(45) Date of Patent: Dec. 24, 2024

(54) CONVEYANCE APPARATUS AND PRINTING APPARATUS

(71) Applicant: CANON KABUSHIKI KAISHA, Tokyo (JP)

(72) Inventors: Hisashi Taniguchi, Kanagawa (JP); Motoyuki Taguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/584,947

(22) Filed: Jan. 26, 2022

(65) Prior Publication Data

US 2022/0236684 A1 Jul. 28, 2022

(30) Foreign Application Priority Data

Jan. 28, 2021 (JP) ................................ 2021-011677

(51) Int. Cl.

| | |
|---|---|
| ***B65H 7/02*** | (2006.01) |
| ***B65H 5/36*** | (2006.01) |
| ***B65H 7/14*** | (2006.01) |
| ***G03G 15/00*** | (2006.01) |

(52) U.S. Cl.

CPC ............ *G03G 15/657* (2013.01); *B65H 5/36* (2013.01); *B65H 7/02* (2013.01); *B65H 7/14* (2013.01); *G03G 15/6529* (2013.01); *G03G 15/70* (2013.01); *B65H 2402/441* (2013.01); *B65H 2404/725* (2013.01); *B65H 2511/51* (2013.01); *B65H 2511/528* (2013.01); *B65H 2553/61* (2013.01); *B65H 2553/83* (2013.01); *B65H 2801/06* (2013.01); *G03G 2215/00717* (2013.01); *G03G 2215/00721* (2013.01)

(58) Field of Classification Search

CPC ........... B65H 2553/61; B65H 2553/80; B65H 2553/81; B65H 2553/83; B65H 2402/441; B65H 2601/11; B65H 2402/45; B65H 2601/321; G03G 21/1633; G03G 21/1638; G03G 2215/00544; G03G 2221/169; G03G 2221/1687; G03G 21/1623; G03G 21/1628

See application file for complete search history.

(56) References Cited

U.S. PATENT DOCUMENTS 8,322,710 B2 * 12/2012 Andoh ................ G03G 15/602 271/145
8,328,189 B2 12/2012 Okamura

FOREIGN PATENT DOCUMENTS

JP 2011-201615 A 10/2011

OTHER PUBLICATIONS

U.S. Appl. No. 17/547,328, Motoyuki Taguchi, filed Dec. 10, 2021.

* cited by examiner

*Primary Examiner* — Jeremy R Severson
(74) *Attorney, Agent, or Firm* — Venable LLP

(57) ABSTRACT

A conveyance apparatus whose detection unit of a printing medium is unlikely to be damaged includes a first guide that is fixed to a main body; a second guide capable of moving to a position at which the second guide forms, together with the first guide, a conveyance path through which a printing medium is conveyed and a position at which the second guide opens the conveyance path; a first lever that is provided to the main body and which detects whether or not the printing medium exists in the conveyance path; and a second lever that shields light, wherein the first lever and the second lever can swing integrally or independently in accordance with the position of the second guide.

11 Claims, 10 Drawing Sheets

| STATE NAME OF PRINTING APPARATUS 1 | STATE OF OPTICAL SENSOR 87 | FLAG VALUE STORED IN STORAGE UNIT 110B | STATE OF PRINTING APPARATUS 1 |
|---|---|---|---|
| FIRST STATE | OFF (LIGHT-SHIELDED) STATE | OFF | NORMAL STATE |
| THIRD STATE | ON (LIGHT-RECEIVING) STATE | ON | DURING CONVEYANCE OR JAM |
| SECOND STATE | ON (LIGHT-RECEIVING) STATE | OFF | OUTER GUIDE 94 UNATTACHED |

FIG.10

CONVEYANCE APPARATUS AND PRINTING APPARATUS

BACKGROUND OF THE INVENTION

Field of the Invention

The present disclosure relates to a conveyance apparatus that conveys a printing medium and in detail, relates to a detection unit configured to detect the presence/absence of a printing medium in a conveyance path within the apparatus.

Description of the Related Art

Conventionally, in a conveyance apparatus that conveys a printing medium in the form of sheet, A detection unit configured to detect a printing medium in a conveyance path of the printing medium is provided and predetermined processing is performed for the detected printing medium after detecting the presence/absence of the printing medium. As the detection unit such as this, a detection lever that detects the abutment of a printing medium is known.

Japanese Patent Laid-Open No. 2011-201615 has disclosed a guide of a printing medium, which is capable of opening the conveyance path by rotation, and a detection lever. In Japanese Patent Laid-Open No. 2011-201615, due to the position relationship between the guide and the rotation axis of the detection lever, in a case where the guide is opened at the time of paper jam processing, the detection lever retracts into the inside of the guide.

SUMMARY OF THE INVENTION

However, in Japanese Patent Laid-Open No. 2011-201615, the detection lever and a light-shielding lever move integrally irrespective of the position of the guide. Consequently, there is a possibility that an impact is exerted on the guide erroneously at the time of opening the guide for the purpose of solving a conveyance abnormality of a printing medium, and there is a risk that the detection unit is damaged in a case where the detection lever comes off and falls, and so on.

Consequently, an object of one embodiment of the present invention is to provide a conveyance apparatus whose detection unit of a printing medium is unlikely to be damaged.

One embodiment of the present invention is a conveyance apparatus including: a first guide that is fixed to a main body; a second guide capable of moving to a position at which the second guide forms, together with the first guide, a conveyance path through which a printing medium is conveyed and a position at which the second guide opens the conveyance path; a first lever that is provided to the main body and which detects whether or not the printing medium exists in the conveyance path; and a second lever that shields light, wherein the first lever and the second lever can swing integrally or independently in accordance with the position of the second guide.

Further features of the present invention will become apparent from the following description of exemplary embodiments with reference to the attached drawings.

BRIEF DESCRIPTION OF THE DRAWINGS

FIG. 10 is a diagram explaining each state of the printing apparatus 1.

DESCRIPTION OF THE EMBODIMENTS

First Embodiment

<General Configuration of Printing Apparatus>

Figure 1A:
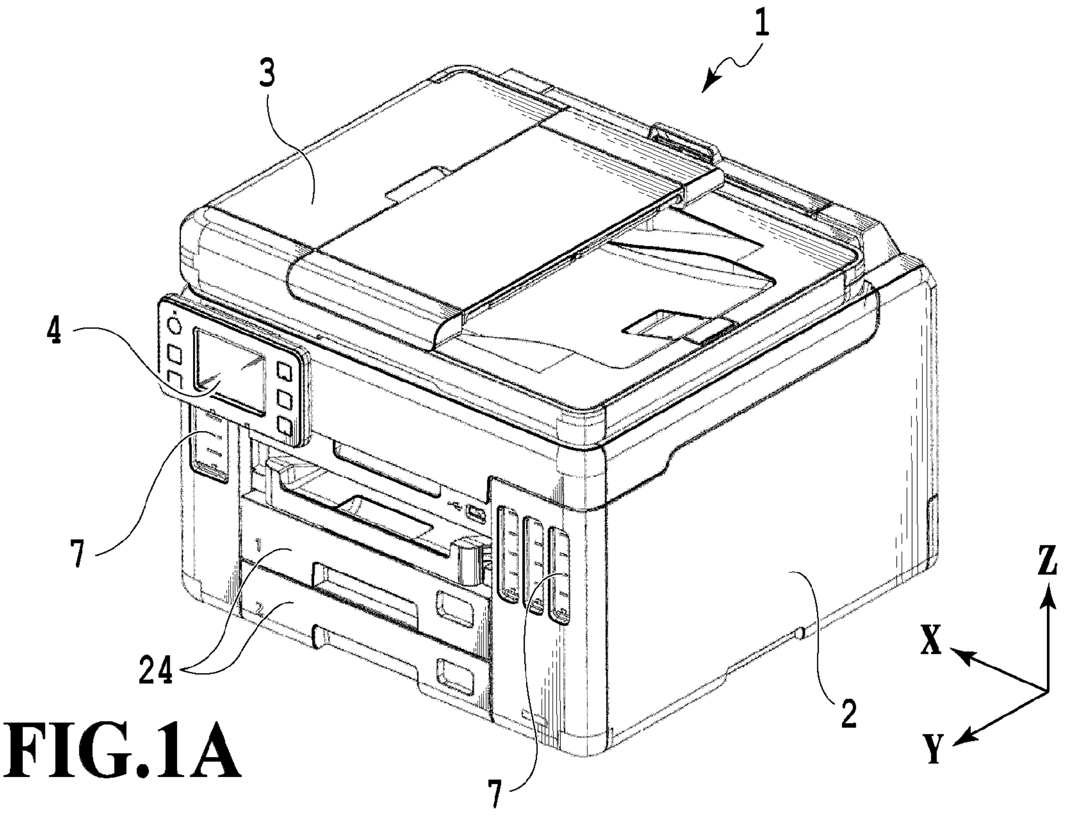
FIG. 1A is a perspective diagram showing an outer appearance of a printing apparatus 1 in a closed state.

FIG. 1A is a perspective diagram showing an outer appearance of a printing apparatus 1 having a conveyance apparatus of a printing medium according to a first embodiment. The printing apparatus 1 has a substantially cuboid shape on the whole and a reading device 3 is provided on the top section of a main body 2 so that the reading device 3 can open and close freely and on the front face of the main body 2, a touch-panel display device 4 that receives the operation of a user is provided.

Figure 1B:
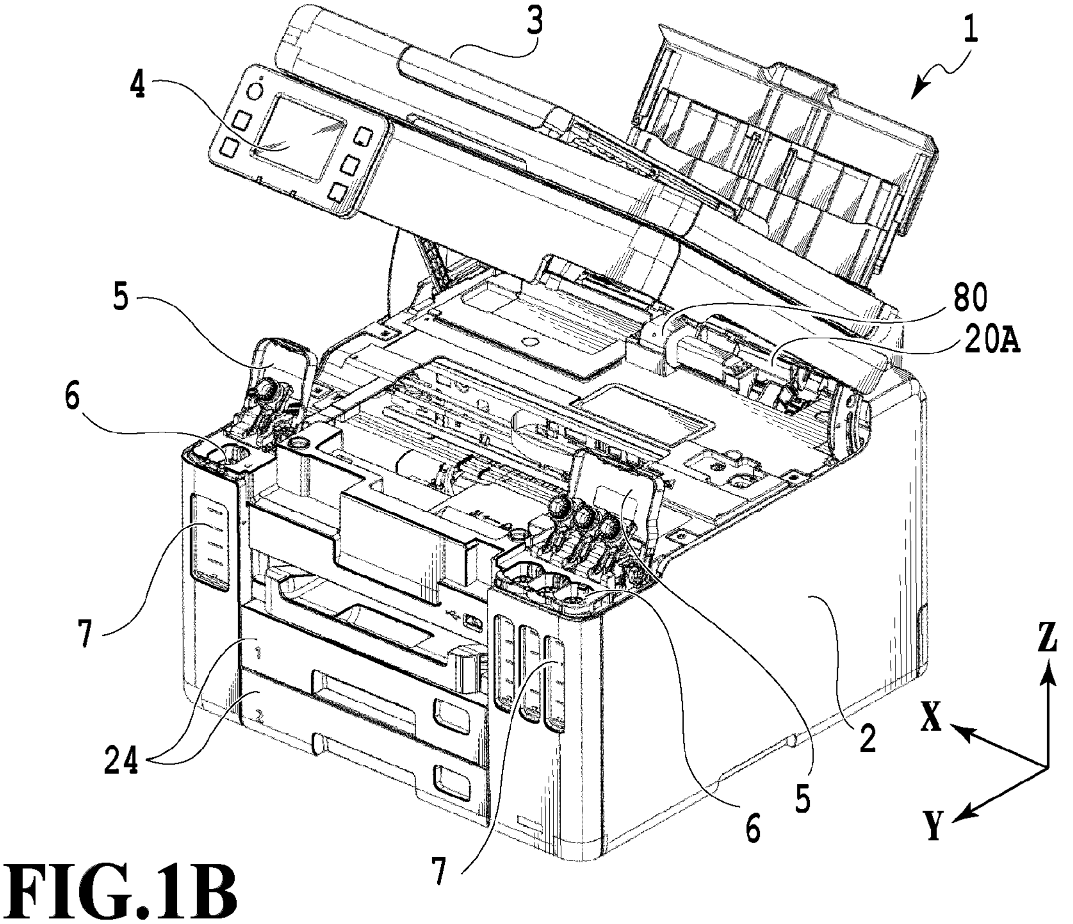
FIG. 1B is a perspective diagram showing an outer appearance of the printing apparatus 1 in an open state.

FIG. 1B is a perspective diagram showing a state (called open state) where each of the reading device 3 and an ink tank cover 5 rotates and opens. On the front face of the printing apparatus 1, an ink filling port 6 for ink filling is provided. To explain coordinate axes in each of FIG. 1A and FIG. 1B, an arrow X indicates the width direction of the printing apparatus 1, an arrow Y indicates the depth direction of the printing apparatus 1, an arrow Z indicates the vertical direction (height direction of the printing apparatus 1) and these directions are perpendicular to one another. For the sake of explanation, in the other diagrams as well, to be explained later, the same coordinate axes as those in FIG. 1A and FIG. 1B are set as needed.

The printing apparatus 1 is a serial ink jet printing apparatus that prints an image by ejecting ink supplied from an ink tank 7 onto a printing medium, but it is also possible to apply the present embodiment to another type of serial printing apparatus. "Printing" includes, in a broad sense, not only a case where significant information, such as a character and a figure, is formed but also a case where an image, a pattern or the like is formed on a printing medium whether or not they are significant, or a medium is modified, and printing is irrespective of whether or not it creates something so that it can be perceived by the human visual sense. Further, in the present embodiment, as the "printing medium", paper in the form of sheet is supposed, but the "printing medium" may be cloth, plastic, film, or the like.

Figure 2A:
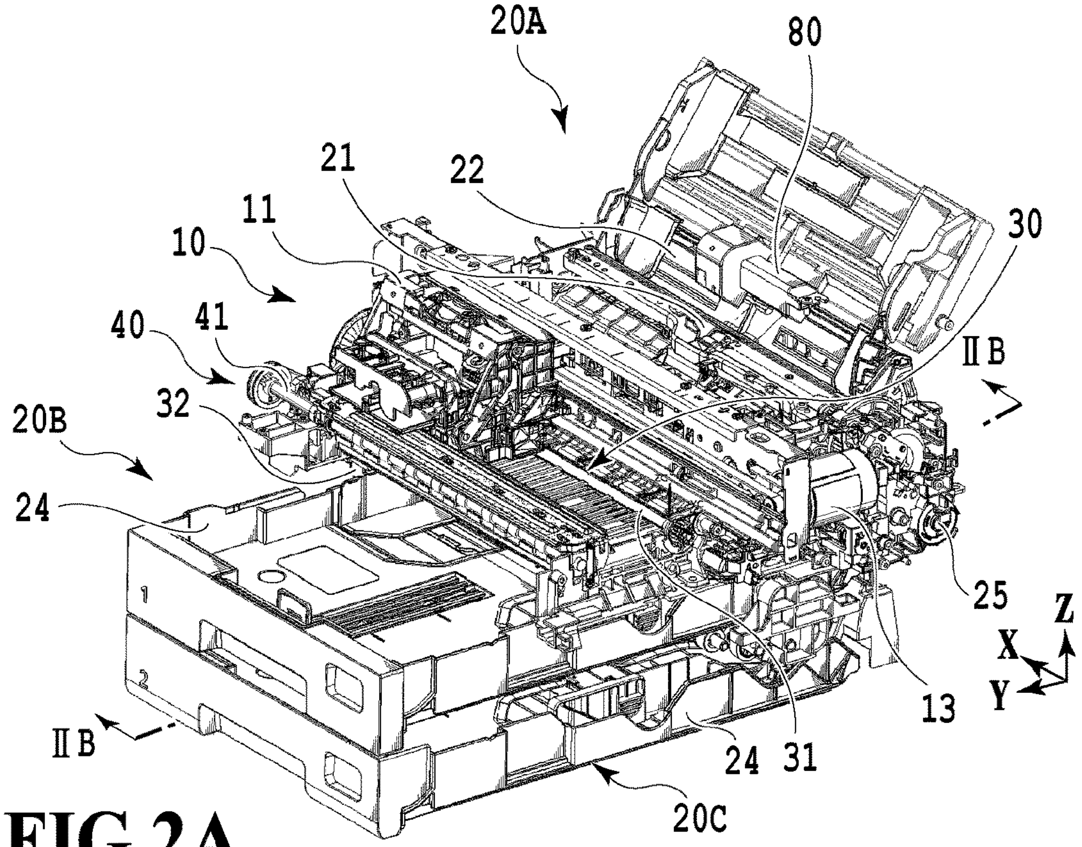
FIG. 2A is a perspective diagram showing an internal mechanism of the printing apparatus 1 in an open state.
Figure 2B:
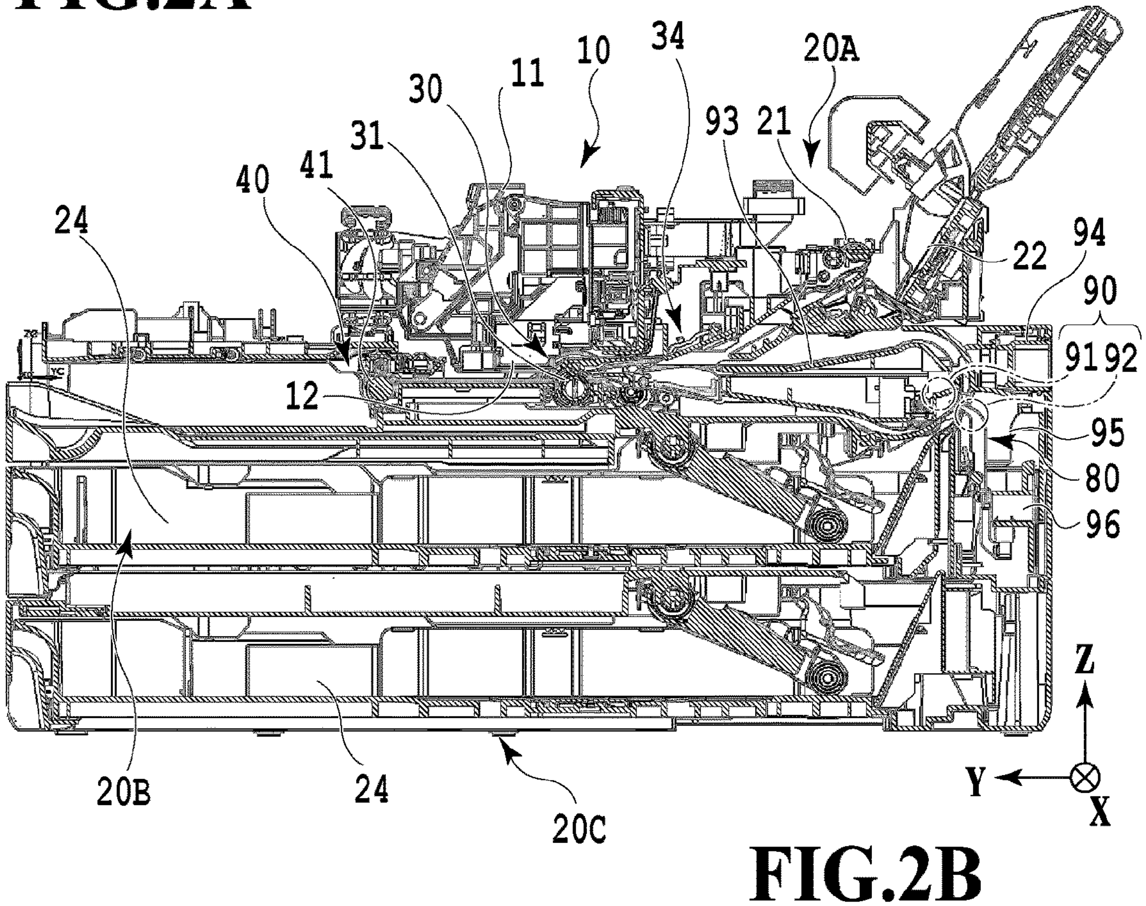
FIG. 2B is a cross-sectional diagram showing the internal mechanism of the printing apparatus 1 in an open state.

FIG. 2A is a perspective diagram showing the internal mechanism of the printing apparatus 1 and FIG. 2B is a cross-sectional diagram showing the internal mechanism of the printing apparatus 1. The printing apparatus 1 has a printing unit 10, feeding units 20A to 20C, a conveyance unit 30, and a discharging unit 40.

The feeding unit 20A, the feeding unit 20B, the feeding unit 20C, the conveyance unit 30, and the discharging unit 40 are each a mechanism of conveying a printing medium. There is a case where the conveyance direction of a printing medium is called "sub scanning direction" and the source side of conveyance (loading table side) is called "upstream side" and the destination side of conveyance (discharge tray side of the discharging unit) is called "downstream side". The sub scanning direction of the present embodiment includes the +Y-direction (feed direction) and the −Y-direction (return direction) in a planar view of the printing apparatus 1.

The printing apparatus 1 has three feeding paths and specifically, the feeding unit 20A configures one of the feeding paths, the feeding unit 20B configures another feeding path, and further, the feeding unit 20C configures the other feeding path. The feeding unit 20A has a feeding roller 21 extending in the X-direction. The feeding roller 21 rotates by the driving force that is generated by a driving source 25 (in the present embodiment, motor) and is capable of conveying a printing medium loaded on a loading table 22. The loading table 22 is arranged at the rear section of the main body 2 and can be opened so that the storage state shown in FIG. 1A and the like changes into the open state shown in FIG. 1B, FIG. 2A, and FIG. 2B.

Each of the feeding unit 20B and the feeding unit 20C has a feeding cassette 24 that is attached detachably to the bottom section of the printing apparatus 1 from the front section and a printing medium stored in the feeding unit 24 is sent to an intermediate conveyance unit 90 provided on the rear side of the printing apparatus 1. The intermediate conveyance unit 90 is provided with an intermediate roller 91 and an intermediate follower roller 92 opposed thereto. The conveyance path of the intermediate conveyance unit 90 includes an inner guide 93 and an outer guide 94 and in the vicinity of the intermediate roller 91, a sheet material detection unit 80 configured to detect the presence/absence of a printing medium P is provided. The outer guide 94 is configured so as to be detachable from the printing apparatus 1 in view of processing (so-called jam processing) to remove a printing medium having caused a conveyance failure, such as a paper jam. In a case where a user opens the outer guide 94 at the time of jam processing, part of the conveyance path is exposed.

The conveyance unit 30 is arranged on the downstream side of the intermediate conveyance unit 90. The conveyance unit 30 has a conveyance roller 31 extending in the X-direction. The conveyance roller 31 rotates by the driving force of a driving source 32 (in the present embodiment, motor) and conveys a printing medium fed from the feeding unit 20A, the feeding unit 20B, or the feeding unit 20C along the Y-direction. A follower roller is caused to come into pressure contact with the conveyance roller 31 and a printing medium is conveyed while being sandwiched by a nip section of the conveyance roller 31 and the follower roller.

The discharging unit 40 is arranged on the downstream side of the conveyance unit 30. The discharging unit 40 has a discharging roller 41 extending in the X-direction. The discharging roller 41 rotates by the driving force of the driving source 32 and discharges a printing medium that is conveyed from the conveyance unit 30.

The printing unit 10 shown in FIG. 2A and FIG. 2B has a driving mechanism that causes the carriage 11 to reciprocate in a predetermined direction. The reciprocation direction of the carriage 11 is called the main scanning direction and in a case of the present embodiment, the main scanning direction is the X-axis direction. There is a case where the movement of the carriage 11 is called a (main) scan and printing an image by the print head 12 while moving the carriage 11 is called a printing scan.

The driving mechanism of the carriage 11 includes, for example, a guide rail that guides the movement in the main scanning direction of the carriage 11 and a belt transmission mechanism that moves the carriage 11 in the main scanning direction by transmitting the driving force from a driving source 13 (in the present embodiment, motor) to the carriage 11.

It is possible to perform printing of an image onto a printing medium by the printing apparatus 1 as follows. A printing medium that is fed from the feeding unit 20A, the feeding unit 20B, or the feeding unit 20C is conveyed intermittently by the conveyance unit 30 and the conveyance of the printing medium and the printing of an image onto the printing medium by the printing unit 10 are performed alternately. To explain in detail, the printing medium is conveyed by the conveyance unit 30 in the sub scanning direction and stops so that the row position at which an image is formed on the printing medium is the image printing position (specifically, directly under the ink ejection surface). Then, during the interruption of the conveyance of the printing medium, the printing scan is performed by moving the carriage 11. Following this, the printing medium is conveyed by the conveyance unit 30 and stops so that the row position at which an image is formed next on the printing medium is the image printing position. Then, during the interruption of the conveyance of the printing medium, the printing scan is performed by moving the carriage 11. After this, the same procedure is repeated. In this manner, it is possible to perform printing of an image on the entire printing medium. In a case where the printing of an image is completed, the printing medium is discharged by the discharging unit 40.

<Configuration of Sheet Material Detection Unit>

Figure 3A:
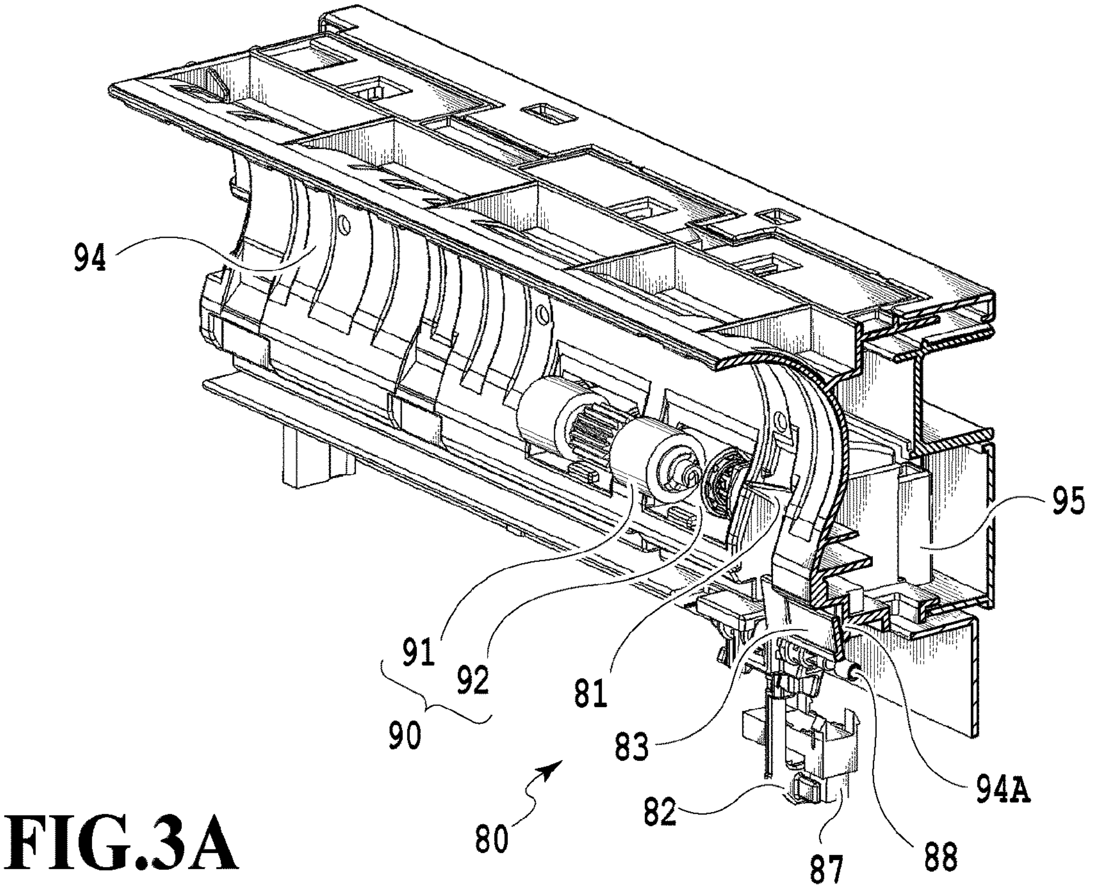
FIG. 3A is a perspective diagram of an intermediate conveyance unit 90 and a sheet material detection unit 80.
Figure 3B:
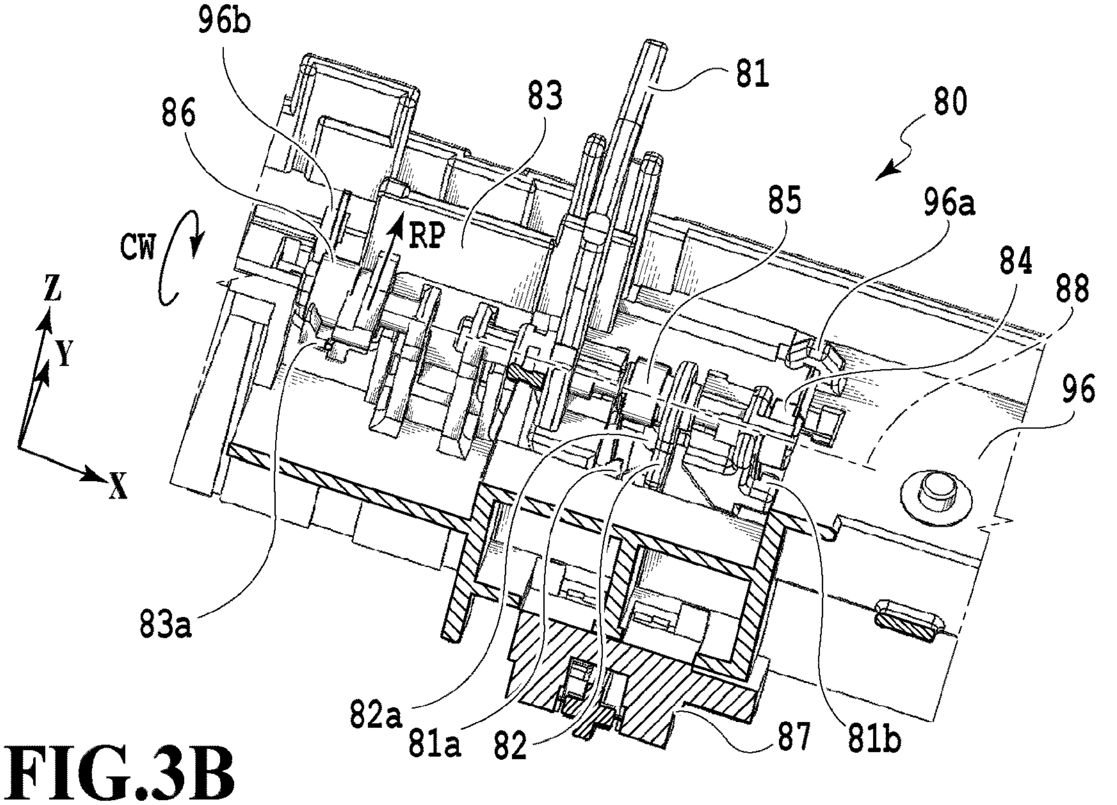
FIG. 3B is a perspective diagram of the sheet material detection unit 80.

Next, the configuration of the sheet material detection unit 80 provided in the intermediate conveyance unit 90, which is the feature of the present embodiment, is explained by using FIG. 3A and FIG. 3B. FIG. 3A is a perspective diagram of the configuration that combines the intermediate conveyance unit 90 configured to convey a printing medium by the intermediate conveyance roller 91 located between the outer guide 94 and the inner guide (not shown schematically), and the sheet material detection unit 80, within the printing apparatus 1 in the usable state. FIG. 3B is a rear diagram in a case where the sheet material detection unit 80 in the state shown in FIG. 3A is seen from the rear side, showing the configuration of the sheet material detection unit 80 alone by not schematically showing the outer guide 94.

The sheet material detection unit 80 has a sheet material detection lever 81 that protrudes over the conveyance path of the intermediate conveyance unit 90 and which can come into contact with a printing medium, an optical sensor 87, and a shielding lever 82 that shields the optical path of the optical sensor 87. As shown in FIG. 3B, the sheet material detection lever 81 and the shielding lever 82 are swingable about an identical rotation axis 88. By biasing a spring hooking section 81*a* of the sheet material detection lever 81 and a spring hooking section 82*a* of the shielding lever 82 with a detection lever connection spring 85, the sheet material detection lever 81 and the shielding lever 82 swing as one unit unless the external force is applied to both the levers at the same time. Further, the sheet material detection lever 81 has a spring hooking section 81*b* at the end section thereof, which is separate from the spring hooking section 81*a*, and to the spring hooking section 81*b*, one end of a detection lever spring 84 is hooked. The other end of the detection lever spring 84 is hooked to a spring hooking section 96*a* of a fixed section 96 to which the sheet material detection unit 80 is attached.

The detection lever spring 84 biases the sheet material detection lever 81 and the shielding lever 82 described previously, which rotate integrally, in the counterclockwise direction (in FIG. 3A, CCW direction in a case where seen in the +X-direction) with respect to the rotation axis 88. Due to this, the shielding lever 82 abuts to the optical sensor 87 attached to the fixed section 96. At that time, as shown in FIG. 3A, the tip of the sheet material detection lever 81 protrudes from the outer guide 94 and blocks the conveyance path, and therefore, the sheet material detection lever 81 rotates by the printing medium that is fed. The load that is applied to the printing medium at this time is equal to the pressure of the detection lever spring 84.

Next, a switching unit 83 is explained. The sheet material detection lever 81 and the shielding lever 82 that are configured as separate units and rotate integrally can rotate about the same rotation axis 88 and as shown in FIG. 3B, are attached to the fixed section 96 at the positions shifted in the X-axis direction. Further, the switching unit 83 has a spring hooking section 83*a* and to the spring hooking section 83*a*, one end of a switching spring 86 is attached. On the other hand, the other end of the switching spring 86 is attached to a spring hooking section 96*b* of the fixed section 96 and the switching spring 86 biases the switching unit 83 in the clockwise direction about the rotation axis 88 (in FIG. 3B, CW direction in a case where seen in the −X-direction).

The biasing force of the switching spring 86 is larger than the total biasing force of the detection lever spring 84 and the detection lever connection spring 85. In the state where the outer guide 94 is attached to the printing apparatus 1, by a pushing section 94A of the outer guide 94 shown in FIG. 3A, the switching unit 83 shown in FIG. 3B is pushed in an RP direction (the same as the +Y-direction).

Figure 4A:
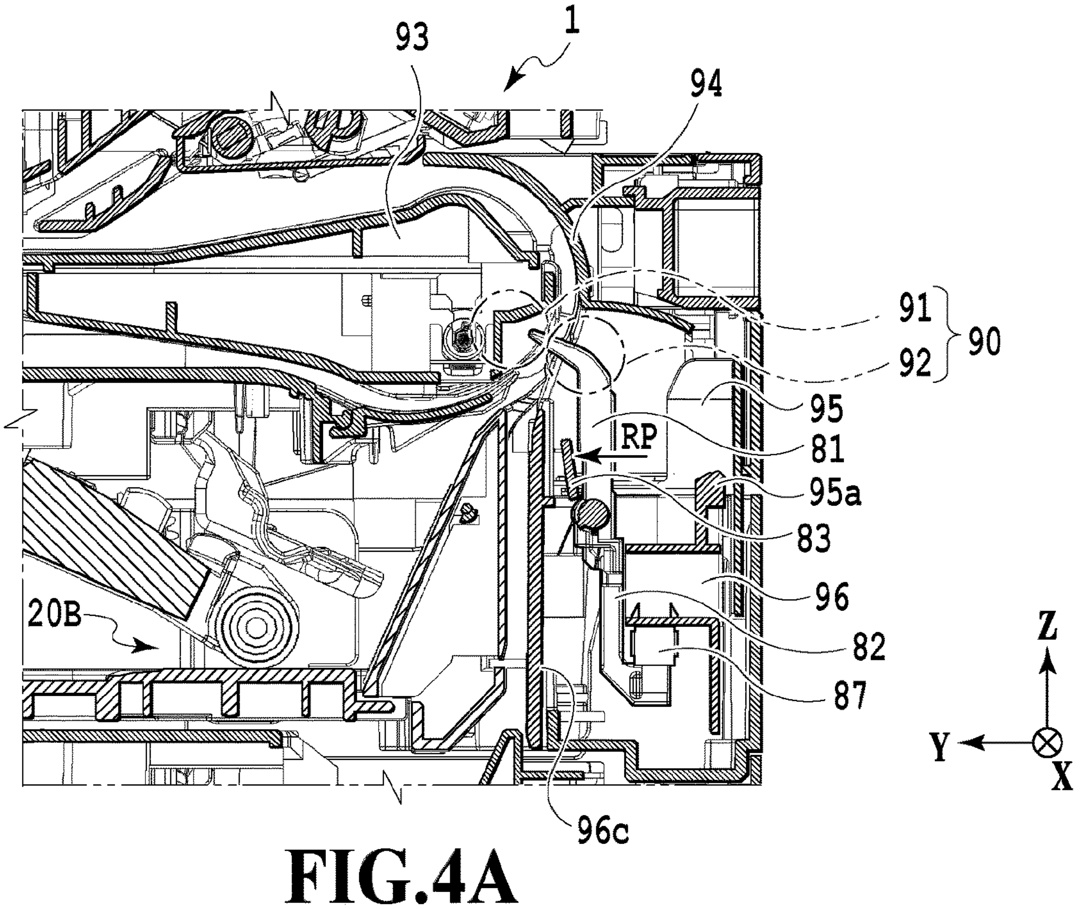
FIG. 4A is an explanatory diagram of a first position that the sheet material detection unit 80 can take.
Figure 4B:
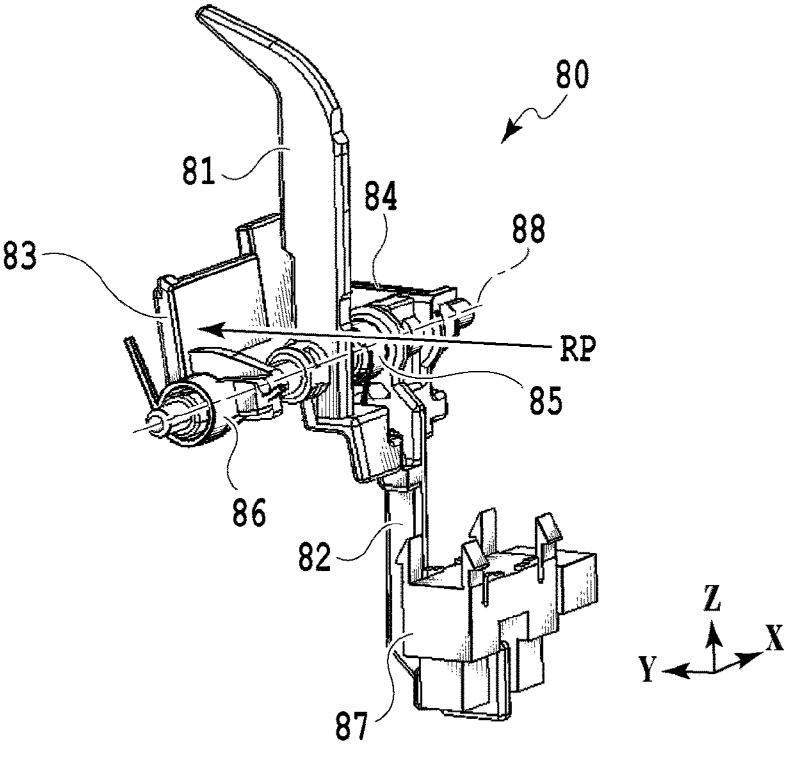
FIG. 4B is a perspective diagram of the sheet material detection unit 80 located at the first position.

FIG. 4A is a cross-sectional diagram of the periphery of the sheet material detection unit 80 in the printing apparatus 1 to which the outer guide 94 is attached and no printing medium is fed and FIG. 4B is a perspective diagram in which only the sheet material detection unit 80 at this time is extracted and shown.

As in FIG. 3A and FIG. 3B, FIG. 4A shows the usable state of the printing apparatus 1 to which the outer guide 94 is attached. In the state where the switching unit 83 pushed in the RP direction by the outer guide 94, the switching unit 83 and the sheet material detection lever 81 are not in contact, and therefore, the sheet material detection lever 81 and the shielding lever 82 are in the state where they can swing integrally about the rotation axis 88. Then, in a case where no printing medium exists in the conveyance path, as shown in FIG. 4A, by the biasing force of the detection lever spring 84, the tip of the sheet material detection lever 81 enters the conveyance path and on the other hand, the shielding lever 82 shields the optical axis of the optical sensor 87. It is possible for a control unit 100 (see FIG. 7), to be described later, to determine that there is no printing medium in the conveyance path of the intermediate conveyance unit 90 in a case of detecting the optical axis shielded by the shielding lever 82. The position of the sheet material detection unit 80 shown in FIG. 4A and FIG. 4B is defined as "first position of the sheet material detection unit 80".

Figure 5A:
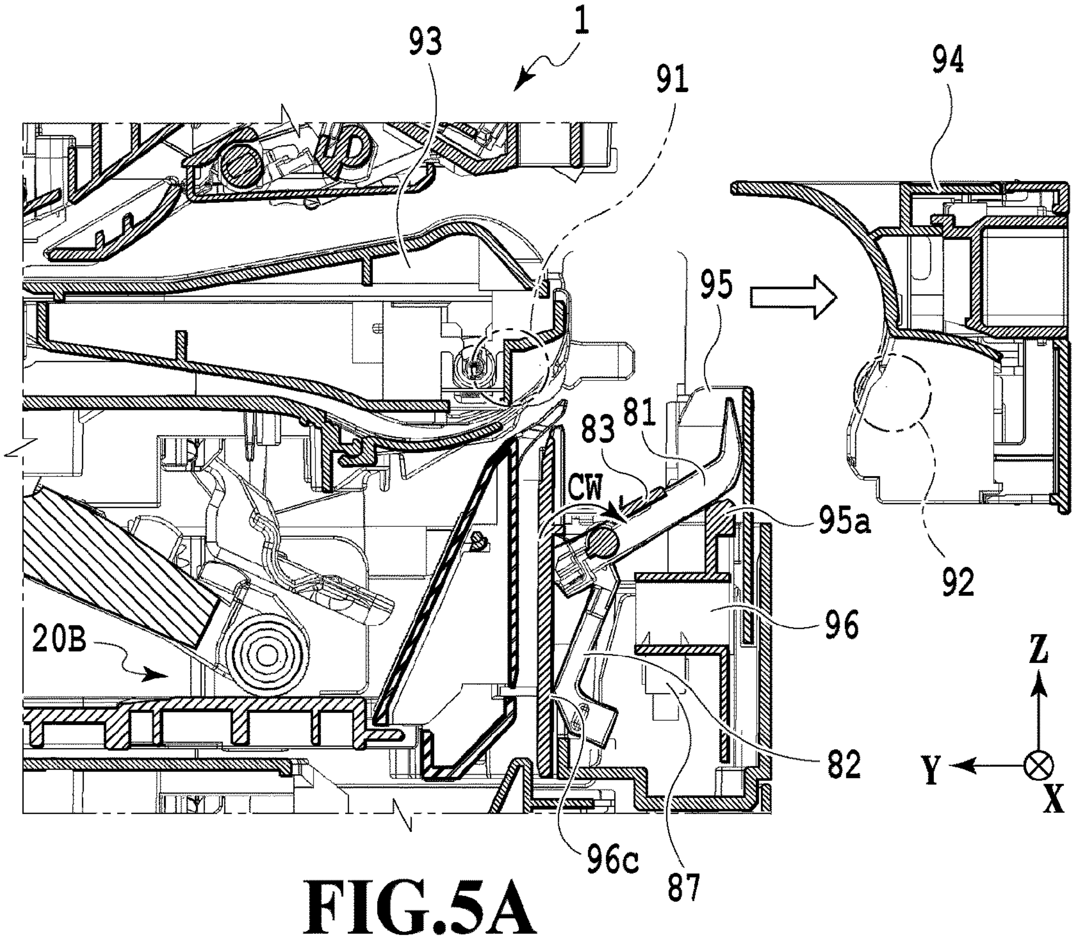
FIG. 5A is an explanatory diagram of a second position that the sheet material detection unit 80 can take.
Figure 5B:
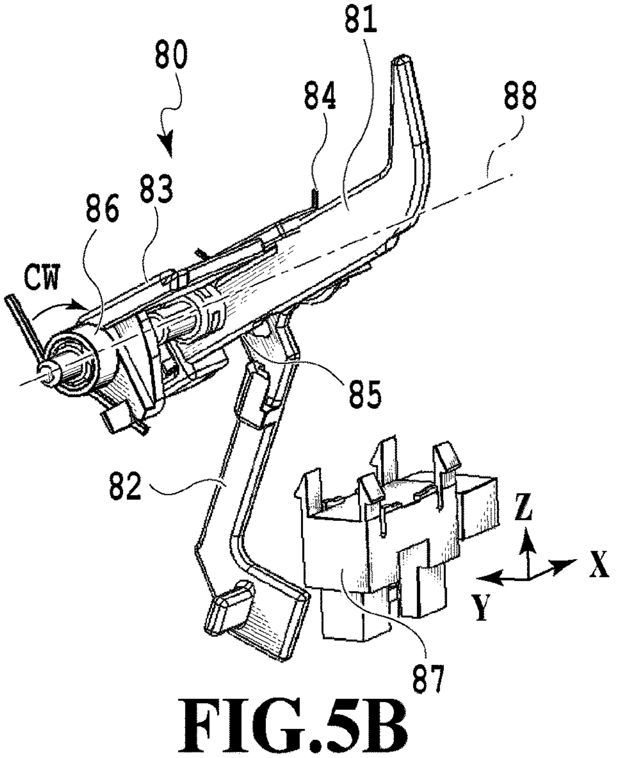
FIG. 5B is a perspective diagram of the sheet material detection unit 80 located at the second position.

In a case where a conveyance abnormality, such as a jam of a printing medium, has occurred in the intermediate conveyance unit 90, a user removes the outer guide 94 from the printing apparatus 1. Due to this, the conveyance path of the intermediate conveyance unit 90 is exposed, and as a result, it is made possible for the user to access the printing medium within the conveyance path and remove the printing medium. FIG. 5A is a cross-sectional diagram of the periphery of the sheet material detection unit 80 in the printing apparatus 1 from which the outer guide 94 is removed and FIG. 5B is a perspective diagram in which only the sheet material detection unit 80 at this time is extracted and shown.

By removing the mobile outer guide 94 from the main body 2 of the printing apparatus 1, the pushing section 94A moves in the direction in which the pushing section 94A becomes more distant from the switching unit 83 of the sheet material detection unit 80. At this time, the switching unit 83 is interlocked with the removal operation of the outer guide 94. In detail, the switching unit 83 rotates about the rotation axis 88 in the clockwise direction by the biasing force of the switching spring 86, that is, rotates in the direction in which the switching unit 83 abuts to the sheet material detection lever 81 (in FIG. 5B, clockwise (CW) direction in a case where seen in the +X-direction) and rotates the sheet material detection lever 81. The printing apparatus 1 is provided with a lever protection unit 95 and the sheet material detection lever 81 rotated by the switching unit 83 abuts to an abutting section 95*a* within the lever protection unit 95 and is stored in the lever protection unit 95. Further, the shielding lever 82 rotates integrally with the sheet material detection lever 81 up to a predetermined position at which the shielding lever 82 escapes from the optical sensor 87, but in a case where the shielding lever 82 abuts to an abutting section 96*c* of the fixed section 96, the shielding lever 82 cannot rotate any more. Consequently, after that, only the sheet material detection lever 81 rotates independently by the switching unit 83. The position of the sheet material detection unit 80 shown in FIG. 5A and FIG. 5B is defined as "second position of the sheet material detection unit 80".

Figure 6A:
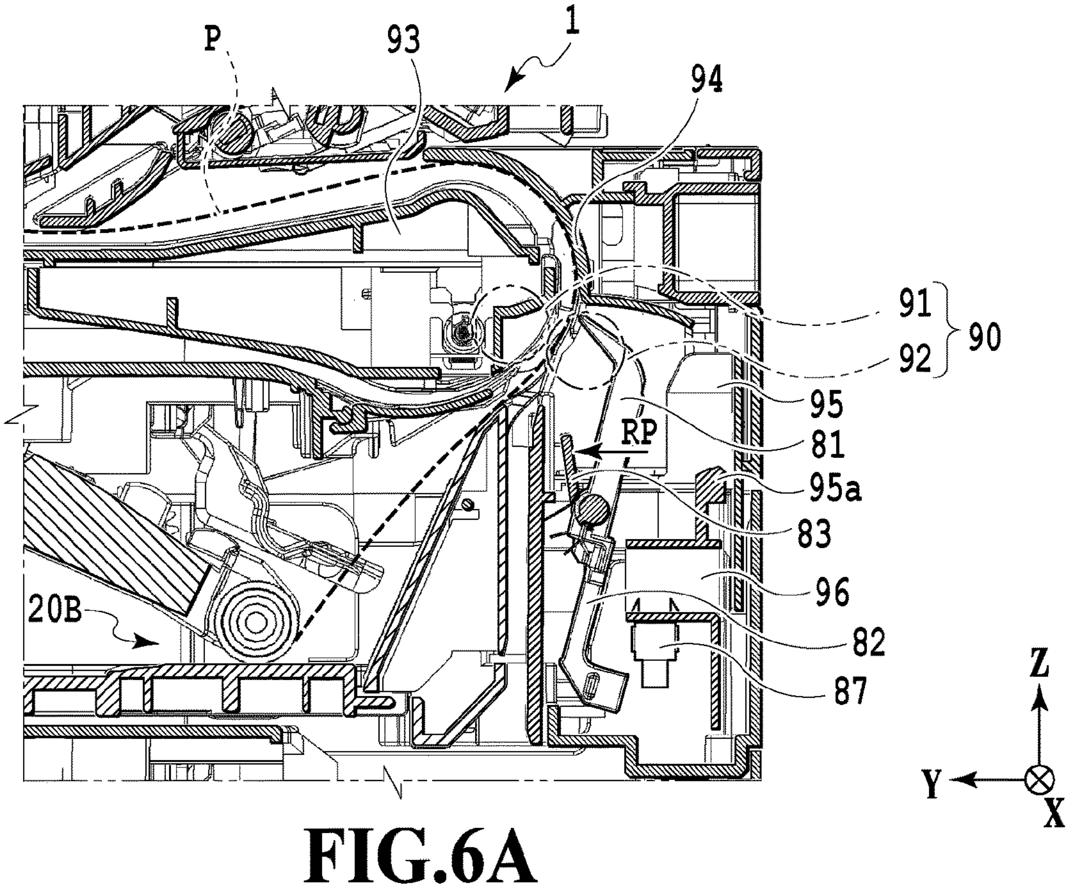
FIG. 6A is an explanatory diagram of a third position that the sheet material detection unit 80 can take.
Figure 6B:
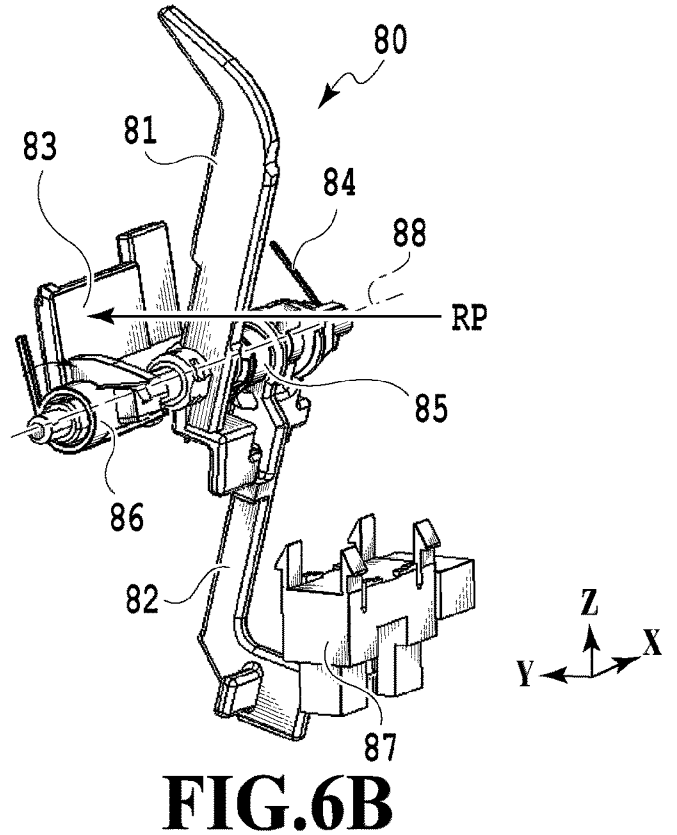
FIG. 6B is a perspective diagram of the sheet material detection unit 80 located at the third position.

Next, the sheet material detection unit 80 in a case where the printing operation is started from the state shown in FIG. 4A and FIG. 4B and the printing medium P is fed from the feeding unit 20B is explained by using FIG. 6A and FIG. 6B. In a case where the printing medium P enters the conveyance path of the intermediate conveyance unit 90 and comes into contact with the tip of the sheet material detection lever 81 and presses down the sheet material detection lever 81, the sheet material detection lever 81 and the shielding lever 82 swing integrally and the shielding lever 82 escapes from the optical sensor 87. Because of this, the optical axis is no longer shielded by the shielding lever 82, and as a result, in a case where the optical axis is detected, it is possible to determine that the printing medium P exists in the conveyance path of the intermediate conveyance unit 90. The position of the sheet material detection unit 80 shown in FIG. 6A and FIG. 6B is defined as "third position of the sheet material detection unit 80". At this time, as described previously, the switching unit 83 is not in contact with the sheet material detection lever 81. Consequently, the sheet material detection lever 81 and the shielding lever 82 are made possible to swing easily because the printing medium P that is conveyed in the conveying path of the intermediate conveyance unit 90 comes into contact with the sheet material detection lever 81 or on the contrary, the printing medium P no longer comes into contact with the sheet material detection lever 81.

<Control Unit>

Figure 7:
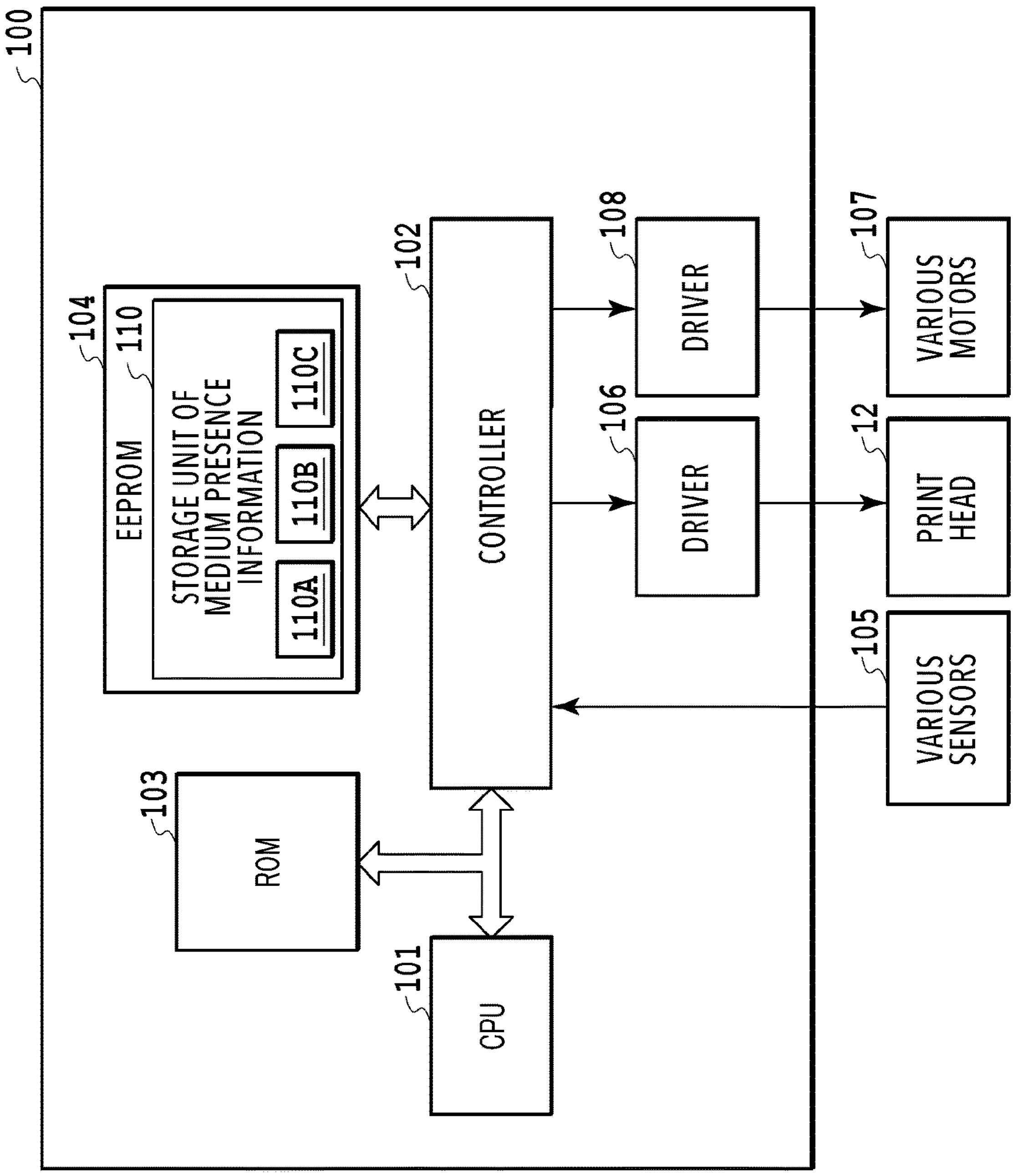
FIG. 7 is a block diagram of a control unit.

In the following, the configuration of the control system of the printing apparatus 1 (see FIG. 1A and FIG. 1B) is explained by using FIG. 7. FIG. 7 is a block diagram of the control unit 100 configured to control the printing apparatus 1. The control unit 100 is a control circuit that controls the operation of each function unit of the printing apparatus 1.

A CPU 101 controls the entire printing apparatus 1. A controller 102 assists the CPU 101 and in accordance with detection results of various sensors 105, controls the drive of various motors 107 and the print head 12.

In a ROM 103, various kinds of data, control programs of the CPU 101, and the like are stored and in an EEPROM 104, various kinds of data and the like are stored. In the EEPROM 104, storage units 110A to 110C configured to store medium presence information relating to the presence/absence of a printing medium within the conveyance path, to be described later, are included. It may also be possible to adopt another storage device in place of the ROM 103 and the EEPROM 104.

A driver 108 drives the various motors 107. The various motors 107 include, for example, the motor of the driving source 25, the motor of the driving source 32, the motor of the driving source 13, and the like. A driver 106 drives the print head 12. The various sensors 105 include a sensor that detects the position of the carriage 11, a sensor that is arranged in a conveyance path of a printing medium and which detects the front/rear ends of the printing medium, a front/rear end detection unit 34 (see FIG. 2B), and the sheet material detection unit 80.

<Storage Unit of Medium Presence Information>

As described previously, the printing apparatus 1 has the front/rear end detection unit 34 (see FIG. 2B), the sheet material detection unit 80 and the like as physical sensors for detecting the presence/absence of a printing medium in the conveyance path. However, it is not possible for these sensors to detect a printing medium unless the printing medium is in direct contact with each sensor. Consequently, the printing apparatus 1 of the present embodiment stores in advance information (referred to as medium presence information) indicating whether or not there is a possibility that a printing medium exists in the conveyance path. The medium presence information is stored in a storage unit 110 of medium presence information (see FIG. 7).

To explain in detail, in the storage unit 110A of medium presence information, information indicating whether or not there is a possibility that a printing medium exists in the conveyance path in a case where sheet feed is performed from the feeding unit 20A is stored. Specifically, a flag value (ON) indicating that there is a possibility of existence of a printing medium or a flag value (OFF) indicating that there is no possibility of existence of a printing medium is stored.

Similarly, in the storage unit 110B of medium presence information, a flag value (ON or OFF) indicating whether or not there is a possibility that a printing medium exists in the conveyance path in a case where sheet feed is performed from the feeding unit 20B is stored. Further, in the storage unit 110C of medium presence information, a flag value (ON or OFF) indicating whether or not there is a possibility that a printing medium exists in the conveyance path in a case where sheet feed is performed from the feeding unit 20C is stored.

As one example, a case is discussed where the printing apparatus 1 operates normally and the flag value OFF is stored in each of the storage units 110A to 110C of medium presence information. In this case, in the stage where the sheet feed is started from the feeding unit 20B, the value stored in the storage unit 110B of medium presence information is updated from OFF to ON. At this time, the flag value stored in each of the storage units 110A and 110B of medium presence information remains OFF and is not updated.

<Initialization Processing of Sub Scanning System>

The printing apparatus 1 that is activated by a user pressing down the power source button or the like selectively performs initialization processing based on signal values obtained from the various sensors 105 and the flag value stored in each of the storage units 110A to 110C of medium presence information. In this initialization processing, initialization processing for the printing system including the print head 12 (called initialization processing of the main scanning system) and initialization processing for the conveyance system including the conveyance path of a printing medium (called initialization processing of the sub scanning system) are included.

Figure 8:
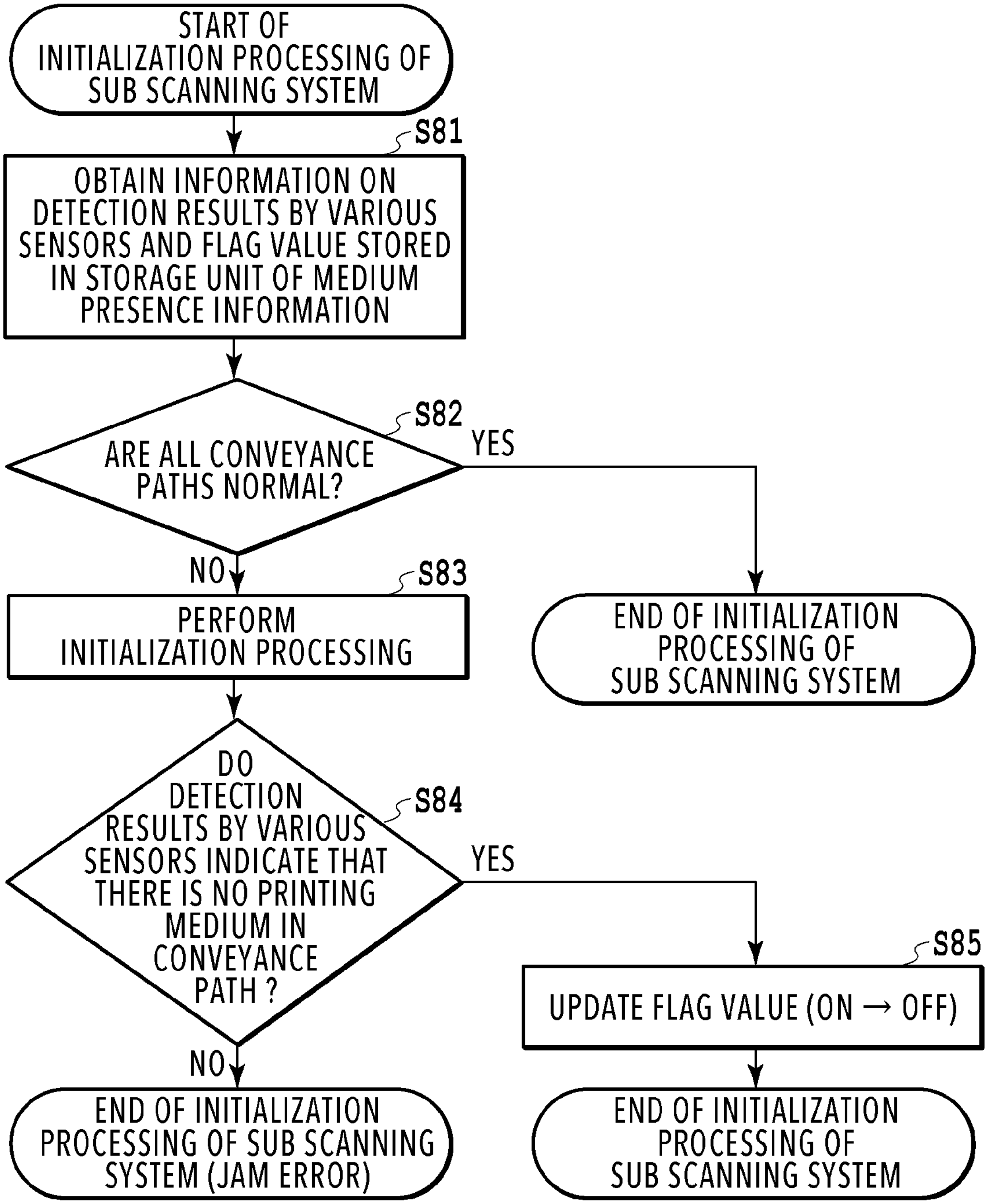
FIG. 8 is a flowchart of initialization processing of a sub scanning system.

In the following, the initialization processing of the sub scanning system is explained by using FIG. 7 and FIG. 8. In a case where a user turns on the power source of the printing apparatus 1, the control unit 100 starts the initialization processing of the sub scanning system shown in FIG. 8.

At S81, the CPU 101 obtains information on the detection results (signal values) by the various sensors 105 and the flag value stored in each of the storage units 110A to 110C of medium presence information.

At S82, the CPU 101 determines whether all the conveyance paths are normal (that is, whether a printing medium exists in none of all the conveyance paths) by using the information obtained at S81. In the present embodiment, the CPU 101 determines that all the conveyance paths are normal in a case where the detection results by the various sensors 105 indicate that no printing medium exists in the conveyance paths and the flag value stored in each of the storage units 110A to 110C of medium presence information is OFF. In a case where determination results at this step are affirmative, the initialization processing of the sub scanning system is terminated normally. On the other hand, in a case where the determination results at this step are negative, the processing advances to S83.

At S83, the CPU 101 performs the initialization processing in accordance with the information obtained at S81. The correspondence relationship between the specific contents of the combination of the information having a possibility of being obtained at S81 and the specific contents of the initialization processing that is performed at this step is determined in advance by a designer.

At S84, the CPU 101 determines whether the detection results by the various sensors 105 indicate that no printing medium exists in the conveyance paths. In a case where determination results at this step are affirmative, the processing advances to S85. On the other hand, in a case where the determination results at this step are negative, the series of processing is terminated (in this case, a conveyance abnormality, such as a jam, has occurred and a user is notified of a message indicating this).

At S85, the CPU 101 updates the flag value stored in the storage unit 110 of medium presence information. As a result of this step, the flag value OFF is stored in each of the storage units 110A to 110C of medium presence information and the initialization processing of the sub scanning system is terminated normally.

The position of the sheet material detection unit 80 in a case where the initialization processing of the sub scanning system is terminated normally (YES at S82, or in a case where the processing at S85 is terminated) is the first position shown in FIG. 4A and in the optical sensor 87, the optical axis is shielded by the shielding lever 82. The state of the printing apparatus 1 at this time is defined as “first state”. In the first state, the detection results by the optical sensor 87 indicate that no printing medium exists in the conveyance paths (called light-shield state, OFF state and the like) and the flag value OFF is stored in each of the storage units 110A to 110C of medium presence information (see FIG. 10).

<Sheet Feed Preparation Processing>

In the following, processing before sheet feed is started (referred to as sheet feed preparation processing), which is performed in the printing apparatus 1 in the first state, is explained by using FIG. 6A and FIG. 6B, FIG. 9, and FIG. 10.

After the initialization processing of the sub scanning system described previously is terminated, in a case where the printing apparatus 1 receives instructions to start printing by receiving a print job or the like, the sheet feed preparation processing for feeding a printing medium from the designated feeding unit among the feeding units 20A to 20C is performed. In the following, explanation is given by taking a case as an example where a printing medium is fed from the feeding unit 20B.

Figure 9:
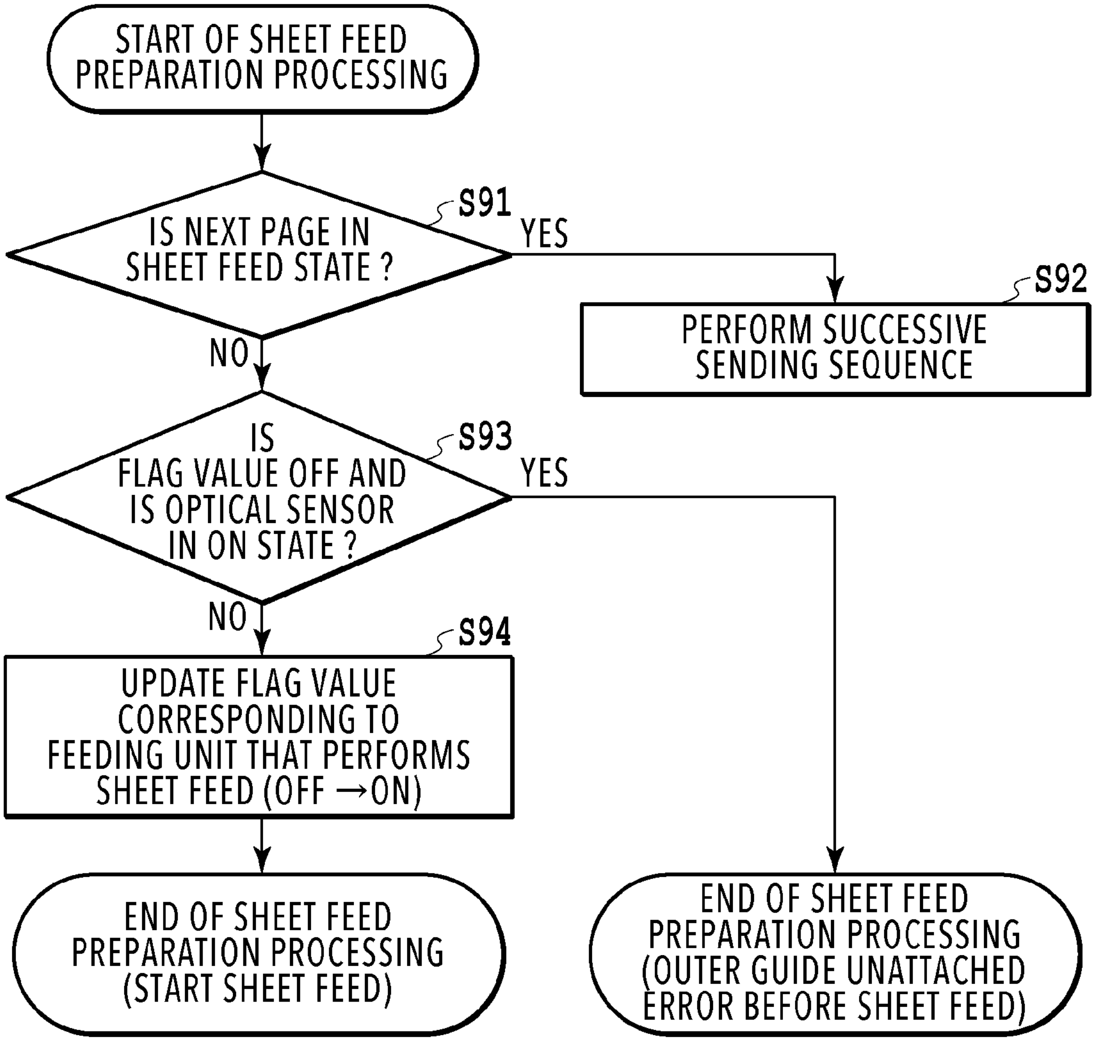
FIG. 9 is a flowchart of sheet feed preparation processing.

At S91, the CPU 101 performs determination of successive sheet feed. Specifically, the CPU 101 determines whether the next page is in the sheet feed state. In a case where determination results at this step are affirmative, the processing advances to S92 and on the other hand, in a case where the determination results are negative, the processing advances to S93. The reason the determination of successive sheet feed is performed at this step is that the series of sheet feed preparation processing shown in FIG. 9 is performed not only after the initialization processing of the sub scanning system shown in FIG. 8 is performed but also before the successive sheet feed is performed.

At S92, the CPU 101 performs a series of processing for successive sheet feed (referred to as successive sending sequence).

At S93, the CPU 101 determines whether the flag value stored in the storage unit 110B of medium presence information is OFF and the detection results by the optical sensor 87 indicate the ON (light-receiving) state. In a case where determination results at this step are affirmative, the series of processing is terminated and on the other hand, in a case where the determination results are negative, the processing advances to S94. For example, in a case where the printing apparatus 1 is in the first state described previously, the flag value stored in the storage unit 110B of medium presence information is OFF and the detection results by the optical sensor 87 indicate the OFF (light-shielded) state. Consequently, in this case, the determination results at S93 are negative and the processing advances to S94.

At S94, the CPU 101 updates the flag value stored in the storage unit 110B of medium presence information. As a result of this updating, the flag value stored in the storage unit 110B of medium presence information is changed from OFF to ON.

After S94, the sheet feed of the printing medium P from the feeding unit 20B is started.

In a case where the fed printing medium P passes the sheet material detection unit 80 including the sheet material detection lever and the like, the sheet material detection lever 81 and the shielding lever 82 swing integrally and the position of the sheet material detection unit 80 changes to the third position (see FIG. 6A) described previously. At this time, the shielding lever 82 has escaped from the optical sensor 87 and the detection results by the optical sensor 87 indicate the ON (light-receiving) state where the printing medium P exists in the conveyance path. The state of the printing apparatus 1 in a case where the flag value stored in the storage unit corresponding to the designated feeding unit is ON and the detection results by the optical sensor 87 indicate the ON state is defined as “third state”. In a case also where a conveyance abnormality, such as a jam, occurs before the printing medium P being fed passes the sheet material detection unit 80 although the sheet material detection unit 80 has been reached, the detection results by the optical sensor 87 indicate the ON state, and therefore, the state of the printing apparatus 1 is the third state similarly.

In the present embodiment, the determination of whether or not a conveyance abnormality has occurred in the conveyance path is performed by using a sensor and control different from the sensor and the control described previously.

<Outer Guide Unattached Error>

In the following, error processing (referred to as outer guide unattached error processing) in a case where the printing apparatus 1 receives instructions to start printing in the state where the outer guide 94 is removed from the printing apparatus 1 in the first state is explained by using FIG. 9. In the following, as in the explanation of the sheet feed preparation processing described previously, explanation is given by taking a case as an example where the feeding unit 20B is designated as the feeding source unit.

The processing at S91 and S92 is the same as the processing described previously.

At S93, the CPU 101 determines whether the flag value stored in the storage unit 110B of medium presence information is OFF and the detection results by the optical sensor 87 indicate the ON (light-receiving) state. As described previously, the sheet feed preparation processing is performed after the initialization processing of the sub scanning system, and therefore, originally, the flag value stored in the storage unit 110B of medium presence information should be OFF and the detection results by the optical sensor 87 should indicate the OFF (light-shielded) state. However, in the case of this example, as shown in FIG. 5A and FIG. 5B, as a result of the outer guide 94 being removed, the position of the sheet material detection unit 80 is the second position and the detection results of the optical sensor 87 indicate the ON (light-receiving) state. Consequently, the determination results at S93 are affirmative and the printing apparatus 1 enters the error state where the outer guide is not attached. At this time, the CPU 101 notifies a user of the error state by displaying a message to the effect that the outer guide 94 is not attached and the like. The state of the printing apparatus 1 in a case where the flag value stored in the storage unit 110B of medium presence information is OFF and the detection results by the optical sensor 87 indicate the ON (light-receiving) state is defined as “second state”.

FIG. 10 is a table in which the state information on the printing apparatus 1 is stored, which is associated with each of combinations of the state indicated by the detection results by the optical sensor 87 and the flag value stored in the storage unit 110B of medium presence information.

Effects and the Like

As described above, in the present embodiment, in a case where the outer guide 94 is removed from the printing apparatus 1 in the jam processing and the like, the sheet material detection lever 81 is stored in the lever protection unit 95 provided in the printing apparatus 1. Due to this, it is possible to prevent the erroneous damage to the sheet material detection lever 81 in a case where the outer guide 94 is removed from the printing apparatus 1. Further, even in a case where the removed outer guide 94 drops accidentally or an impact is applied to the outer guide 94, it is possible to maintain the printing medium detection function because the sheet material detection unit 80 is located in the printing apparatus 1.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to provide a conveyance apparatus whose detection unit of a printing medium is unlikely to be damaged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-011677, filed Jan. 28, 2021, which is hereby incorporated by reference herein in its entirety.

What is claimed is:

1. A conveyance apparatus comprising:

a first guide that is fixed to a main body;

a second guide attachable to the main body so as to form, together with the first guide, a conveyance path through which a printing medium is conveyed, and removable from the main body so as to open the conveyance path;

a first lever that is provided in the main body and which contacts the printing medium existing in the conveyance path;

a second lever that selectively shields light; and a switching portion configured to move between a contact position of being in contact with the first lever in a case in which the second guide is removed from the main body and a non-contact position of not being in contact with the first lever in a case in which the second guide is attached to the main body, wherein the first lever and the second lever swing integrally in a case in which the switching portion is in the non-contact position and the first lever swings with respect to the second lever in a case in which the switching portion is in the contact position.

2. The conveyance apparatus according to claim 1, wherein a position of the first lever includes a first position at which a tip of the first lever protrudes over into the conveyance path, a second position in which the first lever is retracted from the conveyance path, and a third position in which the first lever is pushed by the printing medium existing in the conveyance path.

3. The conveyance apparatus according to claim 2, wherein in a case in which the second guide is attached, the position of the first lever is the first position or the third position, and in a case in which the second guide is removed, the position of the first lever is the second position.

4. The conveyance apparatus according to claim 3, wherein the switching portion effects switching between the first position of the first lever and the second position of the first lever in accordance with a removal operation of the second guide.

5. The conveyance apparatus according to claim 1, further comprising:

an optical sensor that is selectively shielded by the second lever, wherein in a case in which the printing medium exists in the conveyance path, light is not shielded by the second lever and the optical sensor detects the light, and in a case in which the printing medium does not exist in the conveyance path, the light is shielded by the second lever and the optical sensor does not detect the light.

6. The conveyance apparatus according to claim 5, further comprising:

a storage unit configured to store a flag value indicating whether or not there is a possibility that the printing medium exists in the conveyance path; and a control unit configured to perform control to switch subsequent processing based on detection results of the optical sensor and the flag value.

7. The conveyance apparatus according to claim 6, wherein the flag value includes ON indicating that there is a possibility that the printing medium exists in the conveyance path and OFF indicating that the printing medium does not exist in the conveyance path, and in a case where the flag value is OFF and the optical sensor has detected the light, the control unit performs control to notify a user of an error that the second guide is not attached.

8. The conveyance apparatus according to claim 1, wherein the second guide comprises a pushing portion that pushes the switching portion.

9. The conveyance apparatus according to claim 1, wherein a rotation axis of the first lever and a rotation axis of the second lever are identical.

10. The conveyance apparatus according to claim 1, wherein in a case in which the second guide is removed, part of the conveyance path is exposed.

11. A printing apparatus comprising:

the conveyance apparatus according to claim 1; and a print head configured to print on the printing medium conveyed through the conveyance path.

* * * * *